US 8,615,775 B2

(12) United States Patent
Smirnov et al.

(10) Patent No.: US 8,615,775 B2
(45) Date of Patent: *Dec. 24, 2013

(54) MOTOR AND DISK DRIVING DEVICE EQUIPPED WITH MOTOR

(75) Inventors: Viatcheslav Smirnov, Gyunggi-do (KR); Kyung Su Park, Gyunggi-do (KR); Dong Yeon Shin, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 73 days.

This patent is subject to a terminal disclaimer.

(21) Appl. No.: 12/926,138

(22) Filed: Oct. 27, 2010

(65) Prior Publication Data

US 2011/0265106 A1 Oct. 27, 2011

(30) Foreign Application Priority Data

Apr. 23, 2010 (KR) .................. 10-2010-0037935

(51) Int. Cl.
*G11B 17/03* (2006.01)
*G11B 17/028* (2006.01)

(52) U.S. Cl.
USPC ........................ 720/697; 384/296; 310/422

(58) Field of Classification Search
USPC .................. 720/695–699; 360/98.07, 99.08; 384/107, 295, 296, 537–539; 310/67 R, 310/90, 91, 418, 422
See application file for complete search history.

(56) References Cited

U.S. PATENT DOCUMENTS

| 5,623,382 | A * | 4/1997 | Moritan et al. ........... 360/99.08 |
| 2002/0003678 | A1* | 1/2002 | Sakuragi et al. ........... 360/99.08 |
| 2003/0020341 | A1* | 1/2003 | Nagatsuka ................. 310/67 R |
| 2003/0174914 | A1* | 9/2003 | Kull et al. ..................... 384/107 |
| 2004/0008912 | A1* | 1/2004 | Gomyo et al. ................ 384/100 |
| 2004/0028300 | A1* | 2/2004 | Gomyo et al. ................ 384/107 |
| 2004/0189122 | A1* | 9/2004 | Obata et al. ..................... 310/90 |
| 2005/0081226 | A1* | 4/2005 | Torii ............................. 720/697 |
| 2006/0098906 | A1* | 5/2006 | Kull et al. ..................... 384/107 |
| 2008/0046906 | A1* | 2/2008 | Takaki et al. ................. 720/707 |
| 2008/0278027 | A1* | 11/2008 | Ikemoto et al. ............... 310/254 |

FOREIGN PATENT DOCUMENTS

JP 2004-104915 4/2004
KR 10-2008-0097293 11/2008

* cited by examiner

*Primary Examiner* — Wayne Young
*Assistant Examiner* — Adam B Dravininkas

(57) ABSTRACT

There are provided a motor and a disk driving device equipped with the motor. The motor may include a core on which a coil is wound, a rotor having a magnet generating an electromagnetic force through an interaction with the coil, and rotating a shaft, a sleeve housing including an inner diameter part to which a sleeve supporting the shaft is press-fitted, a core seating part extended outside in an outer diameter direction from the inner diameter part, and an outer diameter part extended to an axial lower side of the sleeve from the core seating part, and a base plate including a strength reinforcement part formed therein, the strength reinforcement part being brought into contact with the outer diameter part and at least one part of an inner surface of the core seating part.

18 Claims, 5 Drawing Sheets

MOTOR AND DISK DRIVING DEVICE EQUIPPED WITH MOTOR

CROSS-REFERENCE TO RELATED APPLICATIONS

This application claims the priority of Korean Patent Application No. 10-2010-0037935 filed on Apr. 23, 2010, in the Korean Intellectual Property Office, the disclosure of which is incorporated herein by reference.

BACKGROUND OF THE INVENTION

1. Field of the Invention

The present invention relates to a motor and a disk driving device equipped with the motor, and more particularly, to a motor which may increase a contact area where a base plate is in close contact with an axial lower surface of a sleeve housing and thus, may increase rigidity and reduce a size of the entire motor, and a disk driving device equipped with the motor.

2. Description of the Related Art

In general, a spindle motor installed within an optical disk drive may function to rotate a disk so that an optical pick-up mechanism may read data recorded on the disk.

Along with developments in recent technologies regarding the spindle motor for driving the disk, a sleeve housing may be integrally formed with a base plate in a press molding scheme, a structure in which a ring-shaped stopper is inserted into a lower portion of a shaft exposed to an axial lower surface of a sleeve may be adopted in order to prevent a rotor case from being lifted and thus, may reduce a size of the spindle motor.

Also, the spindle motor may enable a thrust washer supporter where a thrust washer being in close contact with a bottom surface of the lower portion of the shaft is received to be press-fitted to an inner peripheral surface of the base plate.

The thrust washer supporter may include the stopper therein; however, the stopper may be disposed in a state of being lifted in an inner space of the thrust washer supporter.

Accordingly, since the stopper may not be supported within the thrust washer supporter, it is difficult to prevent the shaft from being lifted.

Also, since a stopper ring is disposed in the inner space of the thrust washer supporter, a height of the thrust washer supporter may be increased and thus, it may be difficult to reduce a size of the entire spindle motor.

Also, the shaft may be inserted into the sleeve, and then the stopper may be press-fitted to the shaft to be latched to the sleeve, and thereby the shaft may be fixed to the sleeve. Through this process where the shaft is fixed to the sleeve housing, there arise a problem in that the shaft inserted into the sleeve housing may be upset up and down to be press-fitted and assembled.

Since the thrust washer supporter has the inner space, rigidity of the entire motor may be reduced.

SUMMARY OF THE INVENTION

An aspect of the present invention provides a motor which may increase a contact area where a base plate is in close contact with an axial lower surface of a sleeve housing and thus, may increase rigidity and reduce a size of the entire motor, and a disk driving device equipped with the motor.

According to an aspect of the present invention, there is provided a motor, including: a core on which a coil is wound; a rotor having a magnet generating an electromagnetic force through an interaction with the coil, and rotating a shaft; a sleeve housing including an inner diameter part to which a sleeve supporting the shaft is press-fitted, a core seating part extended outside in an outer diameter direction from the inner diameter part, and an outer diameter part extended to an axial lower side of the sleeve from the core seating part; and a base plate including a strength reinforcement part formed therein, the strength reinforcement part being brought into contact with at least one part of an inner surface of the core seating part and the outer diameter part.

The motor may further include: a stopper ring preventing separation of the shaft by fixing a lower end of the shaft protruded to the axial lower side of the sleeve; and a thrust washer supporter including a stopper ring support part that enables the stopper ring to be supported in a bottom surface of the sleeve.

The base plate and the thrust washer supporter may be integrally formed in a press molding scheme, and an extension line of a top surface of the strength reinforcement part may be formed on an axial upper side than an extension line of a top surface of the stopper ring support part.

The strength reinforcement part may include: a core seating part supporter supporting the inner surface of the core seating part; and an outer diameter part supporter curvedly extended from the core seating part supporter, and supporting an inner surface of the outer diameter part.

The motor may further include: a stopper ring fixing a lower end of the shaft protruded to the axial lower side of the sleeve; a thrust washer including a contact part with which the lower end of the shaft is brought into contact and a stopper ring support part protruded to an axial upper side from an end of the contact part to support the stopper ring; and a thrust washer supporter receiving the stopper ring and the thrust washer.

The thrust washer supporter may be integrally formed with the base plate in a press molding scheme, and a diameter of the inner diameter part may be the same as a diameter of the thrust washer supporter.

The strength reinforcement part may include: a core seating part supporter supporting the inner surface of the core seating part; and an outer diameter part supporter curvedly extended from the core seating part supporter to support an inner surface of the outer diameter part, wherein the core seating part supporter is connected to an outer peripheral part of the thrust washer supporter.

The motor may further include a stopper ring fixing a lower end of the shaft protruded to the axial lower side of the sleeve; a thrust washer disposed in an axial lower side of the stopper ring, and brought into contact with a bottom surface of a lower end of the shaft; and a thrust washer supporter including a stopper ring support part supporting the stopper ring, and a strength reinforcement-extension part of which at least one part is brought into contact with an inner surface of the strength reinforcement part and supported.

The strength reinforcement-extension part may be press-fitted to the strength reinforcement part, from the outside of an outer diameter direction rather than the inner diameter part.

An extension line of a top surface of the stopper ring support part may be formed on an axial upper side than an extension line of a top surface of the strength reinforcement-extension part.

The strength reinforcement part may include: a core seating part supporter supporting a bottom surface of the core seating part; an outer diameter part supporter extended in an axial lower side from an end of the core seating part supporter to support the inner surface of the outer diameter part; and an inner side support part extended in the axial lower side from the other end of the core seating part supporter.

The motor may further include: a stopper ring fixing a lower end of the shaft protruded to an axial lower side of the sleeve; a thrust washer disposed on an axial lower side of the stopper ring, and brought into contact with a bottom surface of a lower end of the shaft; and a thrust washer supporter including a stopper ring support part supporting the stopper ring, and including a strength reinforcement support part extended to an axial lower side from an end part of the stopper ring support part in an outer diameter direction, and press-fitted to the inner side support part.

A diameter of the inner side support part may be the same as a diameter of the inner diameter part.

An extension line of a top surface of the strength reinforcement part may be formed on an axial upper side than an extension line of a top surface of the stopper ring support part.

The motor may further include: a stopper ring fixing a lower end of the shaft protruded to an axial lower side of the sleeve; a thrust washer disposed in an axial lower side of the stopper ring, and brought into contact with a bottom surface of the lower end of the shaft; and a thrust washer supporter receiving the thrust washer and supporting a part of the stopper ring.

The strength reinforcement part may include: a core seating part supporter supporting a bottom surface of the core seating part; an outer diameter part supporter extended to an axial lower side from an end of the core seating part supporter to support the inner surface of the outer diameter part; and a stopper ring support part extended from the end of the core seating part supporter in an inner diameter direction to support the part of the stopper ring.

An extension line of a top surface of the strength reinforcement part may be formed on an axial upper side than an extension line of a top surface of the stopper ring support part.

An end part of the stopper ring support part in an inner diameter direction may include an inner side support part extended to an axial lower side, and an outer peripheral part of the thrust washer supporter is press-fitted to the inner side support part.

According to another aspect of the present invention, there is provided a disk driving device, including: a motor on which a disk is mounted; a frame equipped with the motor; an optical pick-up mechanism optically recording or reproducing the disk; and a transfer mechanism transferring the optical pick-up mechanism in a diameter direction of the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
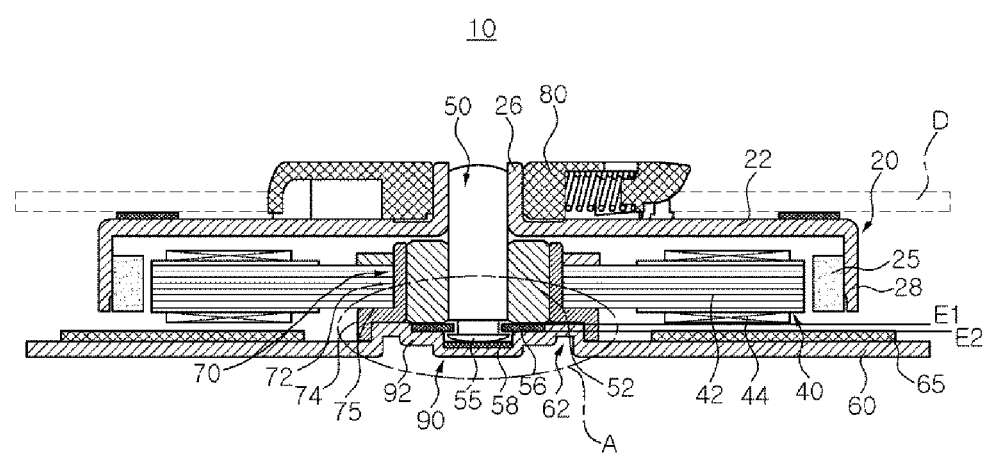
FIG. 1 is a schematic cross-sectional view showing a motor according to a first exemplary embodiment of the present invention.

Exemplary embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, and those are to be construed as being included in the spirit of the present invention.

Further, throughout the drawings, the same or similar reference numerals will be used to designate the same components or like components having the same functions in the scope of the similar idea.

First Exemplary Embodiment

Figure 2:
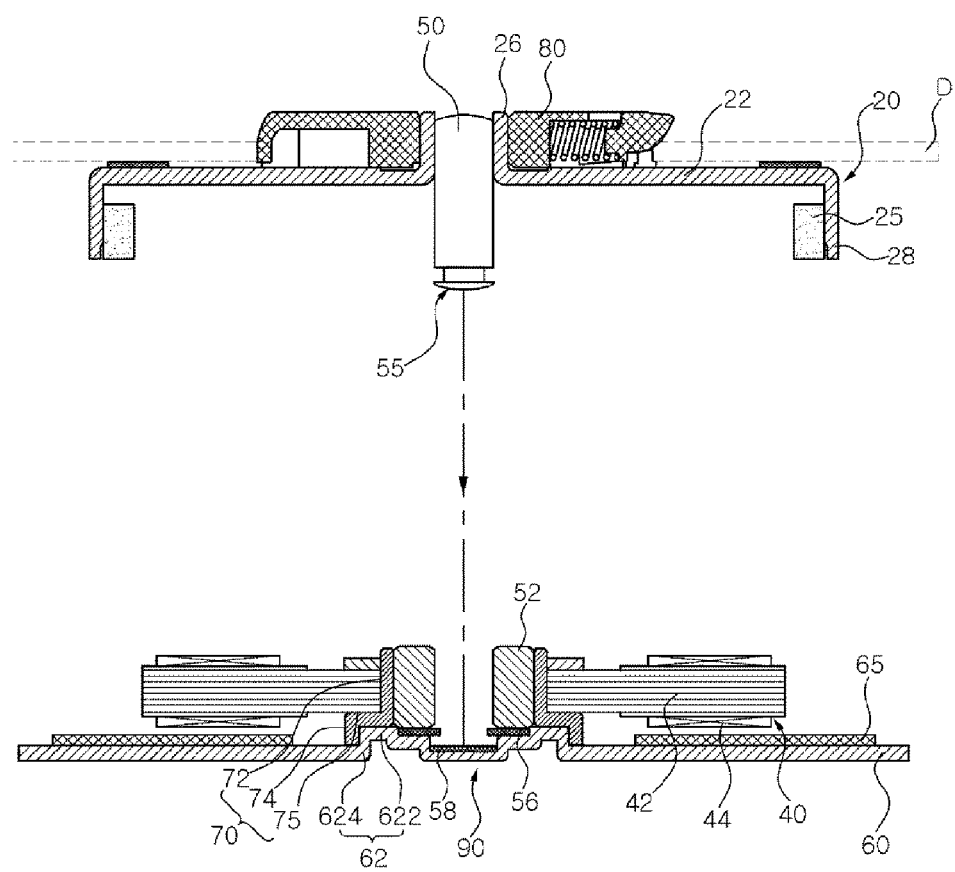
FIG. 2 is an exploded assembling view showing the motor of FIG. 1.

FIG. 1 is a schematic cross-sectional view showing a motor according to a first exemplary embodiment of the present invention, and FIG. 2 is an exploded assembling view showing the motor of FIG. 1.

Referring to FIGS. 1 and 2, the motor 10 according to an exemplary embodiment of the present invention may include a core 42, a rotor 20, and a sleeve housing 70.

Herein, as an example of the motor 10, a spindle motor applied to an optical disk drive rotating a disk (D) will be described, and may include a stator 40 and the rotor 20.

The rotor 20 may include a cup-shaped rotor case 22 of which an annular magnet 25 corresponding to a coil 46 of the stator 40 is formed on an outer peripheral surface of the rotor 20. The magnet 25 may be a permanent magnet that generates an electromagnetic force with a predetermined intensity such that an N-pole and an S-pole are alternately magnetized in a circumferential direction.

The rotor case 22 may include a rotor hub 26 press-fitted to and fastened to a shaft 50, and a magnet coupling part 28 disposing the magnet 25 in an inner surface of the magnet coupling part 28. The rotor hub 26 may be curvedly formed towards an axial upper side in order to maintain an extracting force with a shaft 62, and a chucking mechanism 80 where the disk (D) is placed may be coupled to an outer peripheral surface of the rotor hub 24.

The stator 40 may denote all fixing members excluding rotating members, and include a base plate 60 where a printed circuit board 65 is installed, the sleeve housing 70 where the sleeve 52 is press-fitted and supported, a core 42 fixed in the sleeve housing 70, and a winding coil 44 winding the core 42.

The magnet 25 provided on an inner peripheral surface of the magnet coupling part 28 may be disposed to face the winding coil 44, and the rotor 20 may be rotated through an electromagnetic interaction between the magnet 25 and the winding coil 44.

Meanwhile, terms relating to the directions will be defined as follows. As shown in FIG. 1, an axial direction may denote a vertical direction with respect to the shaft 50, and outer/inner diameter directions may denote an outer end direction of the rotor 20 with respect to the shaft 50, or a central direction of the shaft 50 with respect to an outer end of the rotor 20.

The sleeve housing 70 according to the present exemplary embodiment may be formed in a press molding scheme, and include an inner diameter part 72 to which a sleeve 52 supporting the shaft 50 is press-fitted, a core seating part 75 extended outside in an outer diameter direction from the inner diameter part 72, and an outer diameter part 74 extended to an axial lower side of the sleeve 52 from the core seating part 75.

The base plate 60 may include a strength reinforcement part 62 formed therein. The strength reinforcement part 62 may be brought into contact with at least one part of an inner surface of the core seating part 75 and the outer diameter part 74.

The motor 10 according to the present exemplary embodiment may fix a stopper ring 56 to a lower end 55 of the shaft 50 to prevent the rotor 20 from being lifted occurring due to a rotation of the rotor case 22.

Also, the motor 10 may further include a thrust washer supporter 90 having a stopper ring support part 92 that may enable the stopper ring 56 to be supported in a bottom surface of the sleeve 52.

According to the present exemplary embodiment, the base plate 60 and the thrust washer supporter 90 may be integrally formed in a press molding scheme. Here, an extension line (E1) of a top surface of the strength reinforcement part 62 may be formed on an upper side, in the axial direction, than an extension line (E2) of a top surface of the stopper ring support part 92.

The strength reinforcement part 62 of the base plate 60 may include a core seating part supporter 622 to support an inner surface of the core seating part 75, and an outer diameter part supporter 624 curvedly extended from the core seating part supporter 622 to support an inner surface of the outer diameter part 74.

In this manner, the base plate 60 may include the strength reinforcement part 62 where a contact area being brought into contact with an inner surface of the sleeve housing 70 is increased and thus, a standing state of the motor 10 may become stable, and the verticality of the sleeve housing 70 may be improved.

As for motors according to the following exemplary embodiments, only parts different from those of the motor 10 of the first exemplary embodiment will be hereinafter described in detail.

Second Exemplary Embodiment

Figure 3:
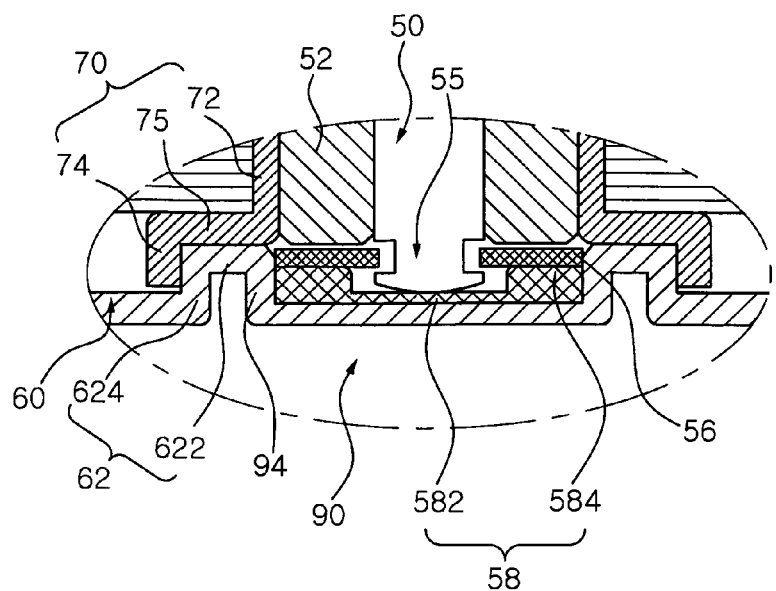
FIG. 3 is a schematic cross-sectional view obtained by expanding "A" of FIG. 1 in a motor according to a second exemplary embodiment of the present invention.

FIG. 3 is a schematic cross-sectional view obtained by expanding "A" of FIG. 1 in a motor according to a second exemplary embodiment of the present invention.

Referring to FIG. 3, the stopper ring 56 of the motor according to the present exemplary embodiment may fix the lower end 55 of the shaft 50 protruded to an axial lower side of the sleeve.

A thrust washer 58 may include a contact part 582 with which a bottom surface of the lower end 55 of the shaft 50 is brought into contact, and a stopper ring support part 584 protruded to an axial upper side from an end of the contact part 582 to support the stopper ring 56.

Meanwhile, a thrust washer supporter 90 may be formed to receive both the stopper ring 56 and the thrust washer 58.

The thrust washer supporter 90 according to the present exemplary embodiment may be integrally formed with the base plate 60 in a press molding scheme. In this instance, a diameter of the inner diameter part 72 of the sleeve housing 70 may be the same as a diameter of the thrust washer supporter 90.

The strength reinforcement part 62 of the base plate 60 according to the present exemplary embodiment may include a core seating part supporter 622 to support the inner surface of the core seating part 75 of the sleeve housing 70, and an outer diameter part supporter 624 curvedly extended from the core seating part supporter 622 to support an inner surface of the outer diameter part 74 of the sleeve housing 70.

Since the base plate 60 and the thrust washer supporter 90 are integrally formed, the core seating part supporter 622 may be connected to an outer peripheral part 94 of the thrust washer supporter 90.

Third Exemplary Embodiment

Figure 4:
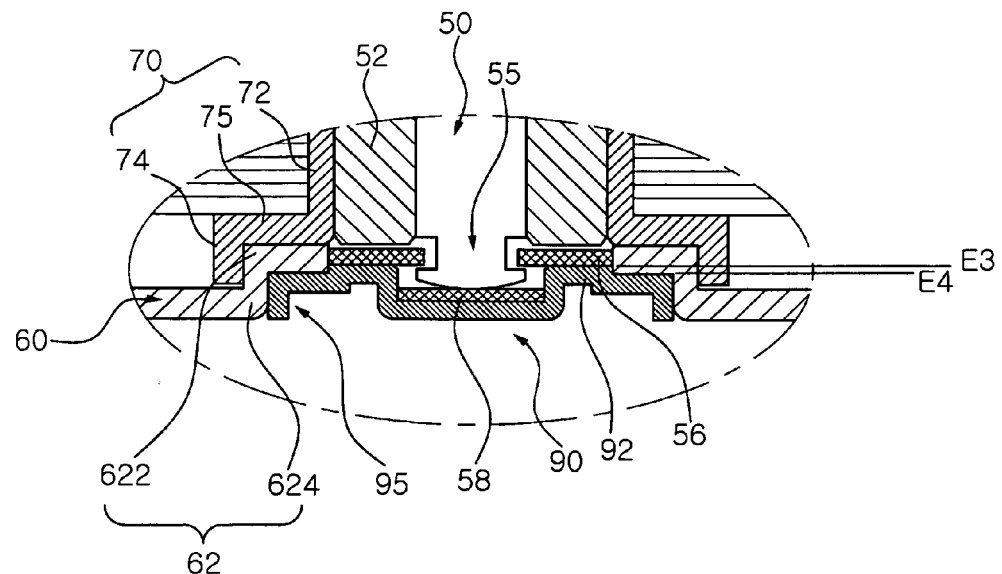
FIG. 4 is a schematic cross-sectional view obtained by expanding "A" of FIG. 1 in a motor according to a third exemplary embodiment of the present invention.

FIG. 4 is a schematic cross-sectional view obtained by expanding "A" of FIG. 1 in a motor according to a third exemplary embodiment of the present invention.

Referring to FIG. 4, the stopper ring 56 of the motor according to the present exemplary embodiment may fix the lower end 55 of the shaft 50 protruded to the axial lower side of the sleeve.

The thrust washer 58 may be disposed in an axial lower side of the stopper ring 56, and brought into contact with a bottom surface of the lower end of the shaft 50.

The thrust washer supporter 90 according to the present exemplary embodiment may include a stopper ring support part 92 supporting the stopper ring 56, and a strength reinforcement-extension part 95 of which at least one part is brought into contact with an inner surface of the strength reinforcement part 62 of the base plate 60, and supported.

Meanwhile, the thrust washer supporter 90 according to the present exemplary embodiment may be formed in a press molding scheme, however, have a structure separated from the base plate 60.

The strength reinforcement-extension part 95 of the thrust washer supporter 90 may be press-fitted to the strength reinforcement part 62, from the outside of an outer diameter direction rather than the inner diameter part 72 of the sleeve housing 70.

In this instance, an extension line (E3) of a top surface of the stopper ring support part 92 may be formed on an axial upper side than an extension line (E4) of a top surface of the strength reinforcement-extension part 95.

Fourth Exemplary Embodiment

Figure 5:
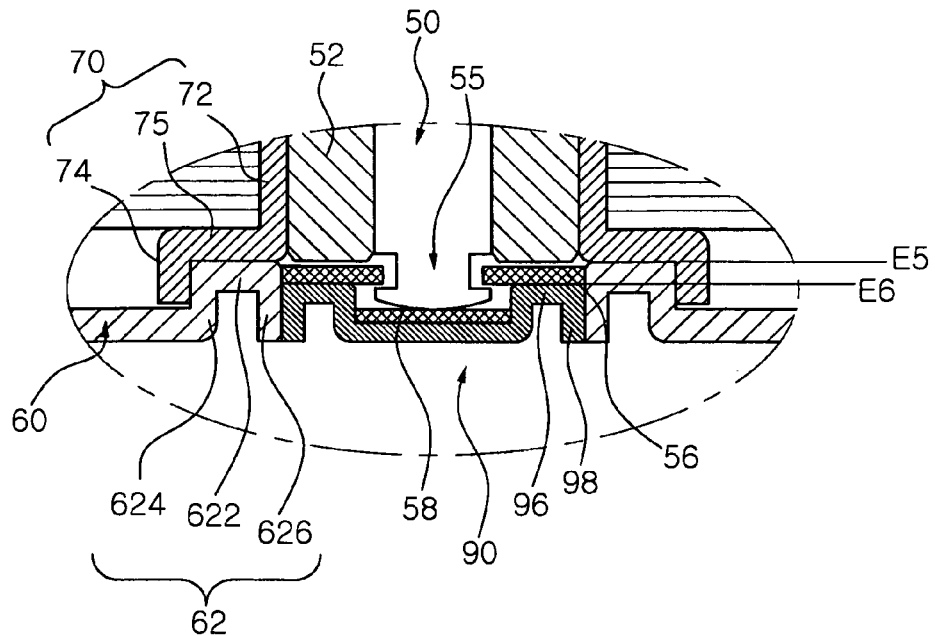
FIG. 5 is a schematic cross-sectional view obtained by expanding "A" of FIG. 1 in a motor according to a fourth exemplary embodiment of the present invention.

FIG. 5 is a schematic cross-sectional view obtained by expanding "A" of FIG. 1 in a motor according to a fourth exemplary embodiment of the present invention.

Referring to FIG. 5, the strength reinforcement part 62 of the base plate 60 according to the present exemplary embodiment may include a core seating part supporter 622 to support a bottom surface of the core seating part 75 of the sleeve housing 70, an outer diameter part supporter 624 extended in an axial lower side from an end of the core seating part supporter 622 to support the inner surface of the outer diameter part 74, and an inner side support part 626 extended in the axial lower side from the other end of the core seating part supporter 622.

The stopper ring 56 of the motor according to the present exemplary embodiment may fix the lower end 55 of the shaft 50 protruded to an axial lower side of the sleeve 52.

The thrust washer 58 may be disposed on an axial lower side of the stopper ring 56, and brought into contact with a bottom surface of the lower end 55 of the shaft 50.

The thrust washer supporter 90 according to the present exemplary embodiment may include a stopper ring support part 96 to support the stopper ring 56, and also include a strength reinforcement support part 98 extended to an axial lower side from an end part of the stopper ring support part 96 in an outer diameter direction, and press-fitted and fixed to the inner side support part 626.

A diameter of the inner side support part 626 of the strength reinforcement part 62 may be the same as a diameter of the inner diameter part 72 of the sleeve housing 70.

Also, an extension line (E5) of a top surface of the strength reinforcement part 62 may be formed on an axial upper side than an extension line (E6) of a top surface of the stopper ring support part 96.

Fifth Exemplary Embodiment

Figure 6:
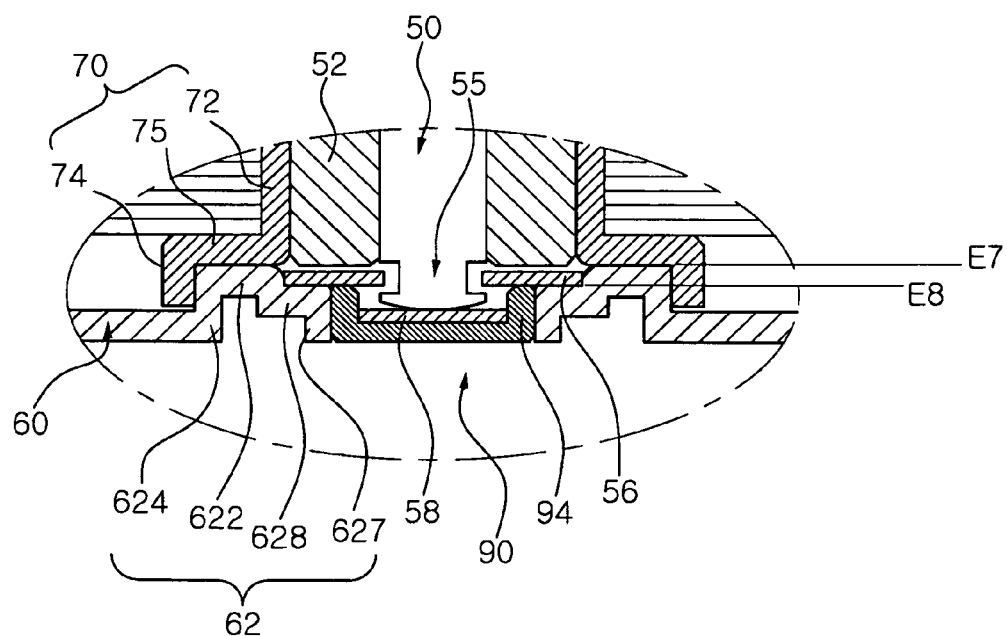
FIG. 6 is a schematic cross-sectional view obtained by expanding "A" of FIG. 1 in a motor according to a fifth exemplary embodiment of the present invention.

FIG. 6 is a schematic cross-sectional view obtained by expanding "A" of FIG. 1 in a motor according to a fifth exemplary embodiment of the present invention.

Referring to FIG. 6, the stopper ring 56 of the motor according to the present exemplary embodiment may fix the lower end 55 of the shaft 50 protruded to an axial lower side of the sleeve 52.

The thrust washer 58 according to the present exemplary embodiment may be disposed in an axial lower side of the stopper ring 56, and brought into contact with a bottom surface of the lower end 55 of the shaft 50.

The thrust washer supporter 90 according to the present exemplary embodiment may receive the thrust washer 58, and support a part of the stopper ring 56.

The strength reinforcement part 62 of the base plate 60 according to the present exemplary embodiment may include a core seating part supporter 622 to support a bottom surface of the core seating part 75 of the sleeve housing 70, an outer diameter part supporter 624 extended to an axial lower side from an end of the core seating part supporter 622 to support the inner surface of the outer diameter part 74 of the sleeve housing 70, and a stopper ring support part 628 extended from the end of the core seating part supporter 622 in an inner diameter direction to support the part of the stopper ring 56.

Here, an extension line (E7) of a top surface of the strength reinforcement part 62, that is, an extension line of the core seating part supporter 622 may be formed on an axial upper side than an extension line (E8) of a top surface of the stopper ring support part 628.

An end part of the stopper ring support part 628 in an inner diameter direction may include an inner side support part 627 extended to an axial lower side, so that the thrust washer supporter 98 may be press-fitted to an inside of the strength reinforcement part 62.

In this instance, an outer peripheral part 94 of the thrust washer supporter 90 may be press-fitted to the inner side support part 627.

Disk Driving Device

Figure 7:
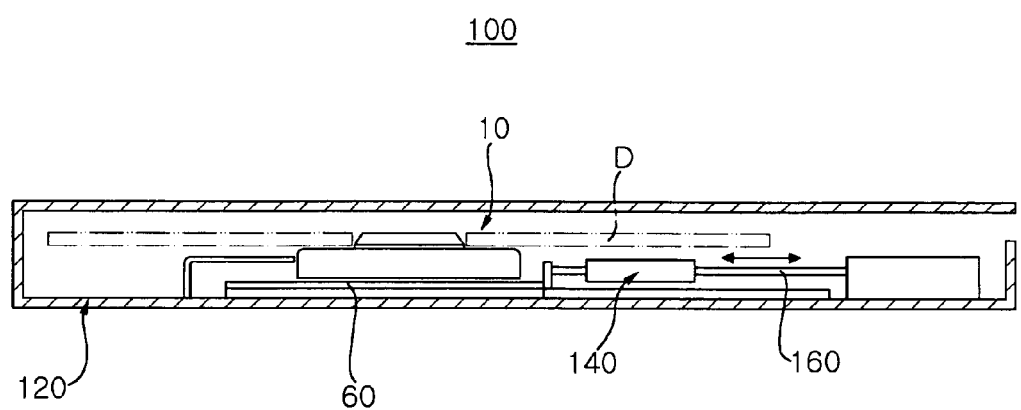
FIG. 7 is a schematic cross-sectional view showing a disk driving device according to an exemplary embodiment.

FIG. 7 is a schematic cross-sectional view showing a disk driving device according to an exemplary embodiment.

Referring to FIG. 7, the disk driving device 100 according to the exemplary embodiment may include the motor 10 having the above described technical features.

The disk driving device 100 according to the present exemplary embodiment may include a frame 120, an optical pick-up mechanism 140, and a transfer mechanism 160.

The base plate 60 on which the motor 10 is mounted may be fixed in the frame 120.

The optical pick-up mechanism 140 may optically record or reproduce the disk (D) placed in the motor 10.

The transfer mechanism 160 may transfer the optical pick-up mechanism 140 in a diameter direction of the disk (D), so that information may be recorded on the entire surface of the disk (D), or may be reproduced.

As set forth above, according to exemplary embodiments of the present invention, there are the motor and the disk driving device equipped with the motor, which may enable a stopper ring to be brought into the bottom surface of the sleeve within the thrust washer supporter, and enable the stopper ring to be supported, thereby preventing separation of the shaft when the motor is lifted.

Also, it is possible to reduce a space required by the thrust washer supporter, thereby reducing a size of the entire motor.

Also, it is possible to increase a contact area between the strength reinforcement part of the base plate and an inner surface of the sleeve housing, thereby increasing rigidity.

Also, it is possible to form the sleeve, the base plate, and the thrust washer supporter in a press molding scheme, thereby readily manufacturing the motor.

Also, it is possible to fix the stopper ring on a bottom surface of the sleeve before fixing the shaft to the sleeve, thereby inserting the shaft in the sleeve on the base plate, and fastening the inserted shaft into the stopper ring, without enabling the motor to be upset up and down. As a result, an assembly process of the motor may be simplified, and an assembly time and cost may be reduced.

While the present invention has been shown and described in connection with the exemplary embodiments, it will be apparent to those skilled in the art that modifications and variations can be made without departing from the spirit and scope of the invention as defined by the appended claims.

What is claimed is:

1. A motor, comprising:
a core on which a coil is wound;
a rotor having a magnet generating an electromagnetic force through an interaction with the coil, and rotating a shaft;
a sleeve housing including an inner diameter part to which a sleeve supporting the shaft is press-fitted, a core seating part extended outside in an outer diameter direction from the inner diameter part, and an outer diameter part extended to a lower side of the sleeve from the core seating part in an axial direction; and
a base plate including a strength reinforcement part formed therein,
the strength reinforcement part being brought into contact with at least one part of an inner surface of the core seating part and the outer diameter part, and
the strength reinforcement part including a core seating part supporter supporting the inner surface of the core seating part and an outer diameter part supporter curvedly extended from the core seating part supporter to support an inner surface of the outer diameter part.

2. The motor of claim 1, further comprising:
a stopper ring preventing separation of the shaft by fixing a lower end of the shaft protruded to the axial lower side of the sleeve; and
a thrust washer supporter including a stopper ring support part that enables the stopper ring to be supported in a bottom surface of the sleeve.

3. The motor of claim 2, wherein the base plate and the thrust washer supporter are integrally formed in a press molding scheme, and an extension line of a top surface of the strength reinforcement part is formed on an axial upper side than an extension line of a top surface of the stopper ring support part.

4. The motor of claim 1, further comprising:
a stopper ring fixing a lower end of the shaft protruded to the axial lower side of the sleeve;
a thrust washer including a contact part with which the lower end of the shaft is brought into contact and a stopper ring support part protruded to an axial upper side from an end of the contact part to support the stopper ring; and
a thrust washer supporter receiving the stopper ring and the thrust washer.

5. The motor of claim 4, wherein the thrust washer supporter is integrally formed with the base plate in a press molding scheme, and a diameter of the inner diameter part is the same as a diameter of the thrust washer supporter.

6. The motor of claim 5, wherein
the core seating part supporter is connected to an outer peripheral part of the thrust washer supporter.

7. The motor of claim 1, further comprising:
a stopper ring fixing a lower end of the shaft protruded to the axial lower side of the sleeve;
a thrust washer disposed in an axial lower side of the stopper ring, and brought into contact with a bottom surface of a lower end of the shaft; and
a thrust washer supporter including a stopper ring support part supporting the stopper ring, and a strength reinforcement-extension part of which at least one part is brought into contact with an inner surface of the strength reinforcement part and supported.

8. The motor of claim 7, wherein the strength reinforcement-extension part is press-fitted to the strength reinforcement part, from the outside of an outer diameter direction rather than the inner diameter part.

9. The motor of claim 7, wherein an extension line of a top surface of the stopper ring support part is formed on an axial upper side than an extension line of a top surface of the strength reinforcement-extension part.

10. The motor of claim 1, wherein:
the core seating part supporter supports a bottom surface of the core seating part;
the outer diameter part supporter is extended in an axial lower side from an end of the core seating part supporter to support the inner surface of the outer diameter part; and
the strength reinforcement part includes an inner side support part extended in the axial lower side from the other end of the core seating part supporter.

11. The motor of claim 10, further comprising:
a stopper ring fixing a lower end of the shaft protruded to an axial lower side of the sleeve;
a thrust washer disposed on an axial lower side of the stopper ring, and brought into contact with a bottom surface of a lower end of the shaft; and
a thrust washer supporter including a stopper ring support part supporting the stopper ring, and including a strength reinforcement support part extended to an axial lower side from an end part of the stopper ring support part in an outer diameter direction, and press-fitted to the inner side support part.

12. The motor of claim 11, wherein a diameter of the inner side support part is the same as a diameter of the inner diameter part.

13. The motor of claim 11, wherein an extension line of a top surface of the strength reinforcement part is formed on an axial upper side than an extension line of a top surface of the stopper ring support part.

14. The motor of claim 1, further comprising:
a stopper ring fixing a lower end of the shaft protruded to an axial lower side of the sleeve;
a thrust washer disposed in an axial lower side of the stopper ring, and brought into contact with a bottom surface of the lower end of the shaft; and
a thrust washer supporter receiving the thrust washer and supporting a part of the stopper ring.

15. The motor of claim 14, wherein:
the core seating part supporter supports a bottom surface of the core seating part;
the outer diameter part supporter is extended to an axial lower side from an end of the core seating part supporter to support the inner surface of the outer diameter part; and
the strength reinforcement part includes a stopper ring support part extended from the end of the core seating part supporter in an inner diameter direction to support the part of the stopper ring.

16. The motor of claim 15, wherein an extension line of a top surface of the strength reinforcement part is formed on an axial upper side than an extension line of a top surface of the stopper ring support part.

17. The motor of claim 15, wherein an end part of the stopper ring support part in an inner diameter direction includes an inner side support part extended to an axial lower side, and an outer peripheral part of the thrust washer supporter is press-fitted to the inner side support part.

18. A disk driving device, comprising:
a motor of claim 1 on which a disk is mounted;
a frame equipped with the motor;
an optical pick-up mechanism optically recording or reproducing the disk; and
a transfer mechanism transferring the optical pick-up mechanism in a diameter direction of the disk.

* * * * *